US00RE35316E

United States Patent [19]

Negersmith et al.

[11] E Patent Number: Re. 35,316

[45] Reissued Date of Patent: Aug. 27, 1996

[54] METHOD FOR FILTERING A FLUID SAMPLE USING AN IN-LINE FLUID FILTER FOR AN AUTOMATED ANALYZER

[75] Inventors: Kent M. Negersmith, Carmel, N.Y.; Gregory A. Farrell, Ridgewood, N.J.

[73] Assignee: Bayer Corporation, Tarrytown, N.Y.

[21] Appl. No.: 970,044

[22] Filed: Nov. 2, 1992

Related U.S. Patent Documents

Reissue of:

[64] Patent No.: 5,064,542
Issued: Nov. 12, 1991
Appl. No.: 430,197
Filed: Mar. 8, 1990

[51] Int. Cl.[6] ..... B01D 29/62

[52] U.S. Cl. ..... 210/798; 210/446; 210/451; 210/455; 210/497.01; 210/510.1; 210/767; 422/44; 422/101; 436/63; 436/177

[58] Field of Search ..... 210/435, 437, 210/446, 449, 451, 455, 459, 460, 463, 510.1, 497.01, 767, 797, 798, 411; 422/101, 44; 436/63, 177, 178

[56] References Cited

U.S. PATENT DOCUMENTS

| | | | |
|---|---|---|---|
| 1,261,558 | 4/1918 | Lackland | 210/451 |
| 1,270,274 | 6/1918 | Dunn | 210/446 |
| 2,401,797 | 6/1946 | Rasmussen | 210/510.1 |
| 2,628,160 | 2/1953 | Stookey | 156/663 |
| 2,752,731 | 7/1956 | Altossar | 210/510.1 |
| 2,797,149 | 6/1957 | Skeggs | 422/82 |
| 2,879,141 | 3/1959 | Skeggs | 422/64 |
| 3,241,432 | 3/1966 | Skeggs et al. | 422/64 |
| 3,482,703 | 12/1969 | Roberts | 210/510.1 |
| 3,493,503 | 2/1970 | Mass | 210/460 |
| 3,751,271 | 8/1973 | Kimura et al. | 210/510.1 |
| 3,795,149 | 3/1974 | Gillette et al. | 210/391 |
| 3,882,026 | 5/1975 | McPhee | 210/451 |
| 4,157,967 | 6/1979 | Meyst et al. | 210/449 |
| 4,170,056 | 10/1979 | Meyst et al. | 210/446 |
| 4,263,140 | 4/1981 | Wujnovich et al. | 210/446 |
| 4,370,381 | 1/1983 | Horikoshi et al. | 210/508 |
| 4,476,023 | 10/1984 | Horikoshi et al. | 210/446 |
| 4,572,611 | 2/1986 | Bellman et al. | 156/84 |
| 4,719,479 | 1/1988 | Kuogoku | 210/510.1 |

*Primary Examiner*—John Kim
*Attorney, Agent, or Firm*—Rodman & Rodman

[57] ABSTRACT

A method for filtering a whole blood sample using a filter element constructed and arranged to block the passage of fibrous and particulate matter which may be present in a liquid sample, such as a whole blood sample, while allowing the blood cells to pass is disclosed. In one embodiment, the filter element is part of an in-line filter assembly which assembly may include two complementary mating components. One component may take the form of a coupling provided with a male threaded portion adapted to be received into and engage the female threaded portion of the complementary mating component. This complemnetary mating component may be another coupling or an analysis system component, such as a valve. Each complementary mating component is adapted to receive a liquid sample carrying conduit therethrough. The coupling is also adapted to receive a filter mount which holds a filter element constructed and arranged as discussed hereinabove. When the complementary mating components are assembled, their respective conduits and the filter element are brought into alignment and fluid tight seal. In an alterntive embodiment, the filter element is permanently retained in a section of conduit which is provided with appropriate connecting means to allow the conduit section to be readily removed from the apparatus when cleaning or replacement is desired.

11 Claims, 3 Drawing Sheets

FIG.5
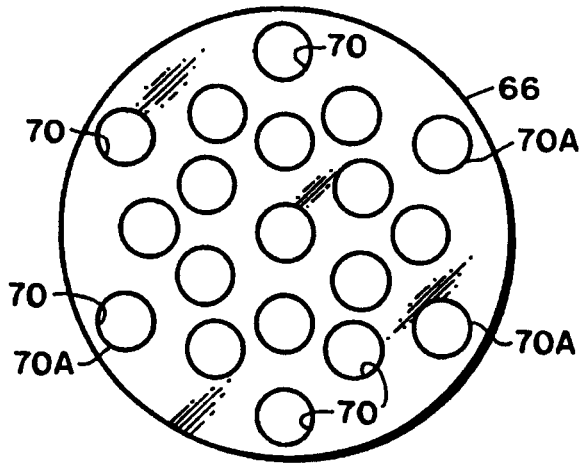
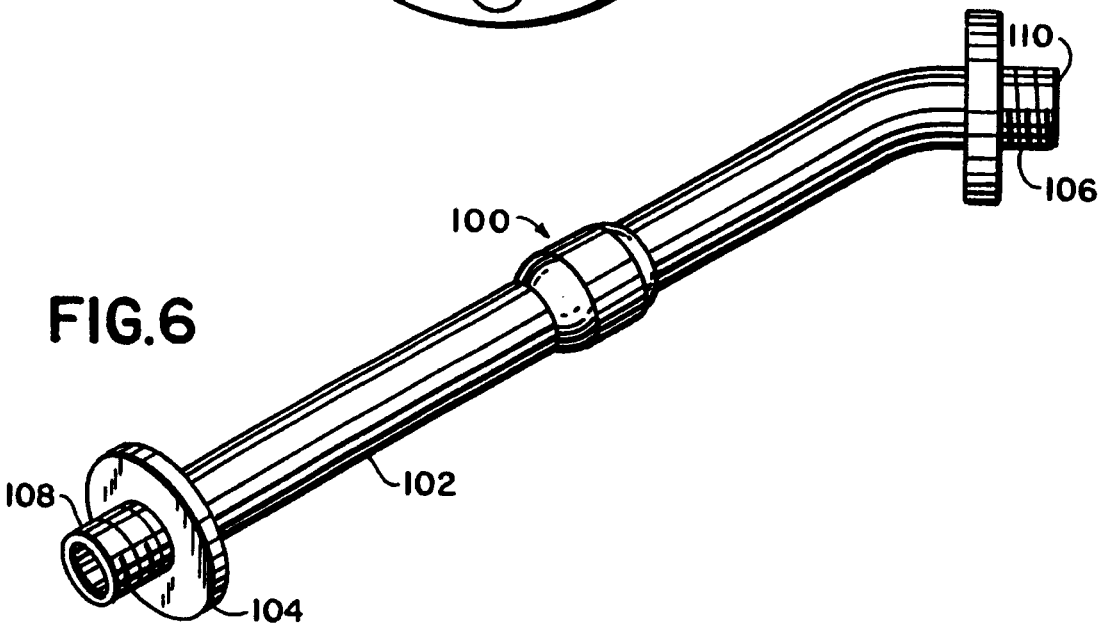
FIG.6
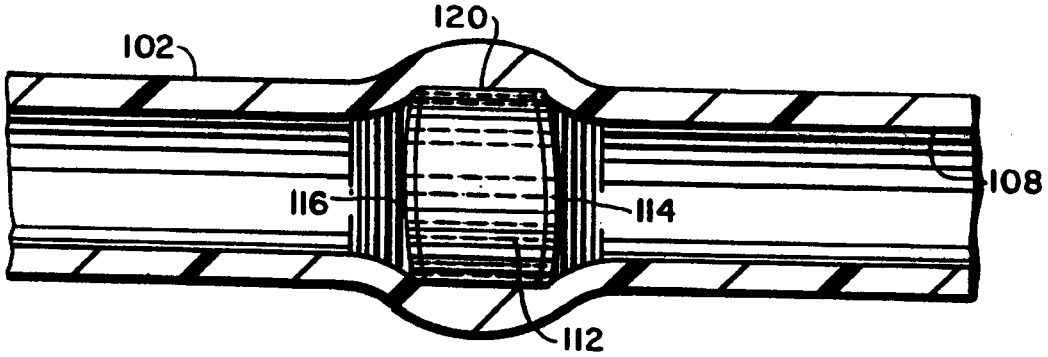
FIG.7

METHOD FOR FILTERING A FLUID SAMPLE USING AN IN-LINE FLUID FILTER FOR AN AUTOMATED ANALYZER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to in-line fluid-type filters for use in automated clinical instrumentation, and more particularly to an in-line fluid-type filter which may be advantageously used to filter whole blood.

2. Prior Art

Clinical apparatus for the analysis of fluids are well known. See, for example, U.S. Pat. Nos. 2,797,149, 2,879,141 and 3,241,432. Typically, analysis apparatus of the automated type provide for the feeding of samples in a flowing stream by means of a take-off device or probe which aspirates liquid sample from a sample container. The aspirated portion of liquid sample is then conveyed through suitable conduits for analysis.

In present day analysis apparatus, only a small quantity of sample may be employed for analysis purposes. Typically, sample flow in the take-off device is at a relatively slow rate, e.g. 1.5 ml/min. The sample conduit and the conduits employed in such apparatus extending from the take-off device to the point of analysis must be relatively small. By way of example only, the sample conveying conduit may have an internal diameter of approximately 0.02 to 0.033 inch. Such a conduit may become clogged during the performance of a series of tests and necessitate the shutdown of the system to clear the conduit. Such clogging or other interference from debris may be the result of foreign matter in the sample or may be due to the existence in the sample of a naturally occurring substance, such as, for example, fibrin, that the substance in whole blood which acts to form the fibrous network in the coagulation of blood.

The prior an has attempted to solve the clogging problem by proposing diverse filtering schemes, but this is not as simple a solution as might first appear. In any contemplated device designed to filter the sample to remove such potential clog-causing matter, care must be taken to avoid restricting significantly the flow of the sample through the filtering device. In view of the relatively small sample size, the amount of sample retained in the filtering device must be kept to a minimum. It is also important when dealing with filtering of whole blood samples that the laminar flow within the conduit be disturbed as little as possible, and that there be a smooth transition downstream from the filter so as not to disrupt the integrity of, e.g. rupture, the cells within the sample.

Filters may be provided at various locations in the conduit systems to catch the clogging or interference causing debris. For example, there are disclosed in U.S. Pat. No. 3,795,149, a method and apparatus for supplying samples for automated analysis wherein liquid from a liquid sample container is aspirated through a filter-equipped inlet end of a probe while the latter is immersed in the liquid. The probe is subsequently removed from the container and immersed in the liquid of a wash receptacle. Prior to immersion in another liquid sample, a fluid other than sample is flushed through the aforementioned filter in a reverse direction to cleanse it of particulate matter, the flushing being in timed relation to the movements of the probe. More particularly, the probe includes a cup-shaped filter extending over the inlet end of a take-off tube. The filter may be formed from a disc of stainless steel, for example, which is suitably etched to provide filter holes therethrough and which is bent up to provide the cup shape. The filter surrounds the inlet in a manner to provide a filtering action. It has been found, however, that cup-shaped filters such as that just described require a significantly high pressure on backflushing to dislodge the material caught in the filter. Although filters formed of material such as stainless steel may appear to the eye to be smooth, nevertheless, there are sharp protuberances and burrs on the surfaces which can trap fibrous matter so that it is not easily dislodged from the filter by backflushing under normal flow pressure, necessitating increased flow pressure for the backflushing cycle. Also, as will be noted hereinbelow, such fibrous matter often becomes further entwined in the filter on backflushing, leading to permanent clogging of the filter after a relatively few cycles. This leads to a high frequency of instrument down time required to clean and/or replace the filter. Furthermore, filters of the type disclosed in U.S. Pat. No. 3,795,149 are preferably fixedly secured to the inlet of the take-off tube, requiring the replacement of the take-off tube assembly each time the filter needs to be replaced.

The use of disc or wafer-shaped filters in an in-line fluid filter arrangement is quite common. In U.S. Pat. No. 4,263,140, there is disclosed such an arrangement which includes a pair of body sections coaxially secured to each other. A filter element is fixedly disposed transversely across a filter chamber defined by the body section intermediate a fluid filter inlet and outlet. This filter element includes an annular mounting flange interposed between mating annular body section end faces. A generally cup-shaped filter element support is fixedly located on at least the outlet side of the filter element and is dimensioned so that the filter element is at least partially received in the cup-shaped area thereof. This support includes an annular mounting rim which is also interposed between the body section end faces. The support allows the filter to experience greatly increased fluid pressure differentials across the filter element. The filter element mounting flange and the support mounting rim are dimensioned to at least extend to the outside diameter of the mating body section annular end faces. The body sections are rigidly affixed to each other at the end faces by means of a fusion type weld with at least a portion of the filter element mounting flange and the support mounting rim comprising a filler material for the weld to assist in producing a joint of high integrity. A pair of the filter element supports may be advantageously employed wherein the supports are in an opposed relationship to each other having the filter element positioned therebetween.

While in-line disc-type filters may prove effective in restricting the passage of particulate foreign matter through the conduit in which they are placed, it has been found that such filters, particularly when used in clinical apparatus for the analysis of whole blood, readily become clogged by the fibrin in the sample. As the aspirated sample of whole blood passes through the filter, the fibrous matter becomes trapped by the filter as intended, but problems often arise in cleaning the trapped matter from the filter. The fibrous matter generally has a length much greater than the width of the filtering element. Attempts to clean the filter by backflushing usually result in the fibrous strand becoming further entangled in the filter, and permanently lodged therein, clogging one or more passages in the filter. The filter is usually sized so that the entanglement of a few fibrous strands will not significantly effect fluid flow therethrough; however, it will be readily appreciated that the filter will eventually become so clogged by the fibrous matter that it seriously restricts fluid flow therethrough, and cannot be cleaned by simple backflushing. It must be replaced. Replacing such in-line filters requires shutting down the apparatus, thus interfering with sample analysis.

A representative sampling of other prior art filtering arrangements intended for filtering blood and other body fluids includes U.S. Pat. Nos. 3,493,503, 3,882,026, 4,170,056, 4,157,967, 4,476,023 and 4,370,381, each or which describes a disc-type filter.

While the prior art demonstrates the development of filter arrangements for automated clinical analyzers to the best of our knowledge, the prior art does not teach or describe a filter arrangement which will effectively remove potential clog causing materials from the sample fluid stream while at the same time lengthening the interval between filter backflushing and replacements. It is a principal object of the present invention to provide such a filter.

SUMMARY OF THE INVENTION

The present invention contemplates a new and improved in-line filter arrangement which overcomes the above and other problems, and which is simple, reliable and which increases, significantly, the time between filter replacements.

The unique feature of the subject invention is a filter element constructed and arranged to block the passage of fibrous and particulate matter which may be present in a liquid sample such as whole blood, while allowing the blood cells to pass. A further feature of the filter element is its construction which resists permanent clogging by such fibrous and particulate matter. Specifically, the filter element includes a generally cylindrical body portion having a multiplicity of equal size passageways therethrough. Preferably, the diameter of each passageway is smaller than the diameter of the smallest passageway or conduit in the automated clinical analyzer through which the filtered sample will flow. The passageways are oriented parallel to the longitudinal axis of the body portion. The body portion and consequently the passageways preferably have a length at least as long as the average length of the fibrous matter believed to be present in the whole blood sample. In such an arrangement, the fibrous matter trapped within the passageways is readily displaced therefrom by backflushing of the filter element.

In one embodiment, the filter element is part of an in-line filter assembly which assembly may include two complementary mating components. One component may take the form of a coupling provided with a male threaded portion adapted to be received into and engage the female threaded portion of the complementary mating component. This complementary mating component may be another coupling or an analysis system component, such as, a valve. Each complementary mating component is adapted to receive a liquid sample carrying conduit therethrough. The coupling is also adapted to receive a filter mount which holds a filter element constructed and arranged as discussed hereinabove. When the complementary mating components are assembled, their respective conduits and the filter element are brought into alignment and fluid tight seal.

In an alternative embodiment, the filter element is permanently retained in a section of conduit which is provided with appropriate connecting means to allow the conduit section to be readily removed from the apparatus when cleaning or replacement of the filter element is desired.

It is among the advantages of a filter arrangement embodying the present invention that it can be used with assurance that the filtered sample will actually be substantially free of fibrous material, and particulate matter found in the unfiltered sample.

The filter arrangement can be reused many times by backflushing it while in place in the apparatus with a suitable liquid, such as isotonic saline, to remove the material which has accumulated on the upstream side of the filter element and in the longitudinal passages thereof.

The filter element may be cleared of debris by ultrasonic or conventional washing techniques. The material used in the filter construction is compatible with commonly used cleaning agents.

The invention accordingly comprises the construction hereinafter described, the scope of invention being indicated in the claims.

DESCRIPTION OF THE DRAWINGS

The above and other objects and significant advantages of the present invention are believed made clear by the following detailed description thereof taken in conjunction with the accompanying drawings wherein:

FIG. 5 is an enlarged end view of the filter element;

FIG. 6 is a perspective view of an alternative embodiment of an in-line filter assembly incorporating the concepts of the present invention; and FIG. 7 is an enlarged sectional view of a portion of the alternative embodiment of FIG. 6.

DETAILED DESCRIPTION OF THE PREFERRED EMBODIMENTS

Figure 1:
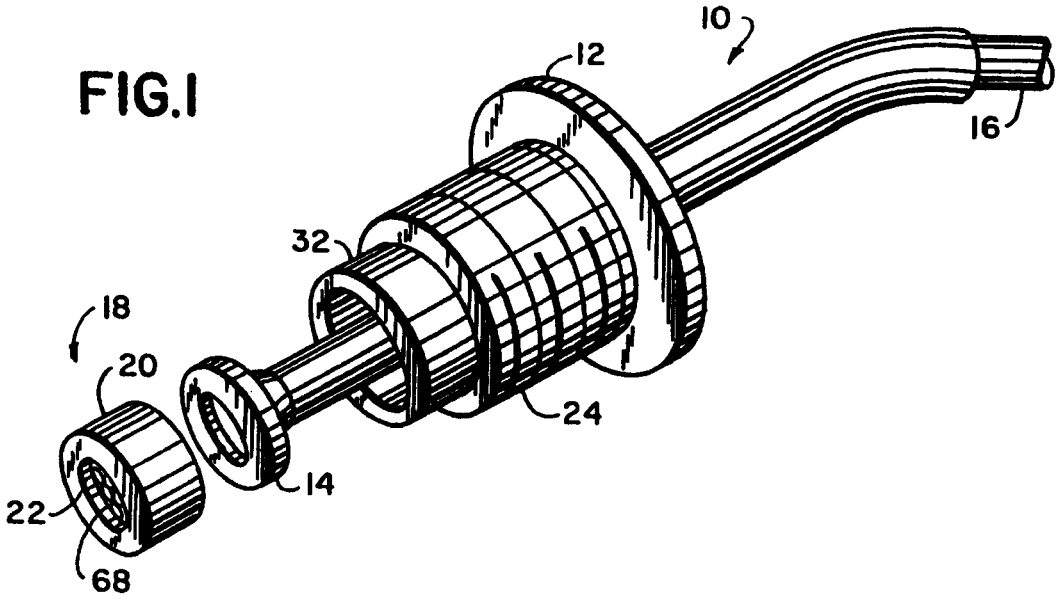
FIG. 1 is an exploded view of a portion of an in-line filter assembly incorporating the concepts of the present invention.

Referring now to the drawings, there is illustrated in FIG. 1 an exploded view of one preferred embodiment of the in-line filter arrangement of the subject invention which is identified generally by the reference numeral 10. As will be appreciated, the in-line filter arrangement of the present invention is intended for use primarily in a clinical apparatus for analyzing blood samples, e.g. whole blood. A number of materials could be advantageously employed for the components of the in-line filter as are commonly used in such applications, although, with respect to certain components described below preferred materials will be specified.

The filter arrangement 10 includes a filter adapter 12 adapted to be positioned on the flared end 14 of a conduit 16 as will be described hereinafter, for free rotational motion with respect to the conduit. A filter assembly 18 is provided and includes a filter mount 20 having a filter element 22 positioned therein. As can be best seen in FIG. 2, the filter adapter 12 may take the form of a conventional coupling that is threaded as shown at 24 for the screwing thereof into a complementarily mating component, as will be described hereinafter. The coupling 12 has stepped bore 26 extending centrally thereof. Stepped bore 26 includes first and second portions 28 and 30 with the former being of a smaller diameter than the latter. The end 32 of the coupling 12 includes a relatively small unthreaded portion as indicated at 34 in FIG. 2. The stepped bore 26 may include a section of gradually increasing diameter 36 to allow a certain freedom of angular displacement or movement of the coupling 16 with respect to the conduit.

The conduit 16, which extends through the axially bore 26, terminates at its flared end 14 in bore section portion 30.

In this embodiment of the present invention, the filter arrangement is designed to be releasably fastened to a complementary system component, such as valve assembly or mating coupling component. With continued reference to FIG. 2, the coupling 12 is shown in conjunction with a mating coupling member 38. The mating coupling member 38 may comprise a body member 40 having a stepped, generally axial bore 42 extending therethrough, including axially aligned bore sections 44, 46, 48 and 50. Bore section 50 is threaded as indicated at 52 almost to the inner end thereof, leaving an unthreaded bore section 54 of relatively small axial extent at the inner bore end.

A conduit 56 extends through the axial bore 42 and terminates at a flared end 58 in bore section 46.

Figure 3:
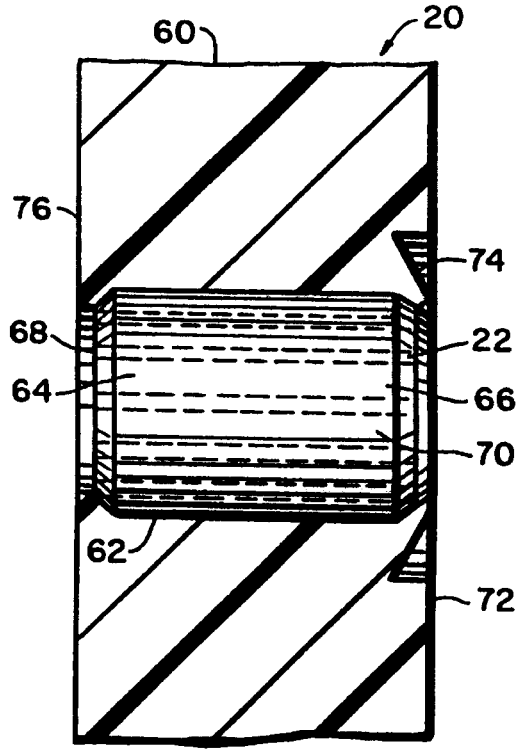
FIG. 3 is an enlarged sectional view of the filter mount.
Figure 4:
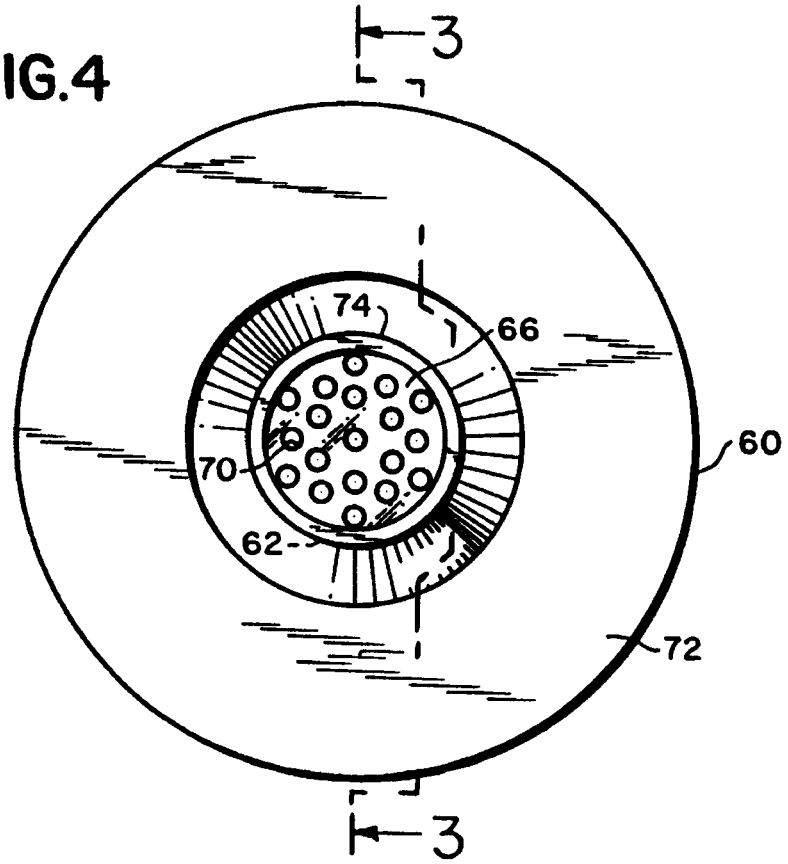
FIG. 4 is an end view of the filter mount of FIG. 3.

FIGS. 3, 4 and 5 comprise a more detailed showing of the preferred filter assembly, including filter mount 20 and filter element 22 as utilized in the subject invention. More particularly, with reference to FIG. 3, the filter mount includes a generally cylindrical body portion 60 having an axially extending bore 62 therethrough. The bore 62 is sized with respect to the outer dimension of the cylindrical filter element 22 so that the latter may be close-fitted and then ring staked and thus securely held therein.

The filter element 22 includes a generally cylindrical body portion 64 having opposed, generally parallel faces 66 and 68 which are substantially perpendicular to the longitudinal axis of the filter element. The filter element is preferably formed of a glass material processed as Fotoform® glass material, manufactured in accordance with procedures established by Corning Glass Works, Corning, N.Y. Reference should be had to U.S. Pat. No. 2,628,160 and 4,572,611 in which the process for the manufacture of such material, and its composition, respectively, are disclosed. The subject matter of U.S. Pat. No. 2,628,160 and 4,572,611 are incorporated herein by reference. Alternatively, the filter element may be formed from ceramic, an extruded material such as polytetrafluoroethylene, or from other materials and by other techniques known to those skilled in the art. The body portion 64 preferably has a diameter of approximately 0.060 inches and a length of approximately 0.080 inches. Extending axially through the filter element body portion 64 are a multiplicity of flow passages 70 as shown. Each flow passage 70 extends parallel to the axis of the body portion 64, and is approximately 0.008 inch in diameter. In the preferred embodiment of the present invention, there are 19 passageways. Obviously, the exact number of passages in the filter element is dependent upon the diameter of the filter element and the required fluid flow rate. Ideally, the filter should be designed to provide the greatest percentage of open area possible without effecting the structural integrity of the filter. The passages should be in number and size to minimize the effect of the filter on laminar flow of the sample through the conduit and the disruptive effects on sample cell integrity. It has been found that passages of the aforenoted number. e.g. 19, with a diameter of approximately 0.008 inch each have a minimal effect on pressure loss through the filter and are effective to trap fibrin and other clog-forming matter in the whole blood sample while allowing the cells in the sample to pass undisturbed therethrough. Preferably, the edge 70a of each passage 70 is rounded to eliminate sharp protuberances or burrs which may catch fibrous matter and prevent the same from being backflushed from the filter as will be described hereinafter.

Figure 2:
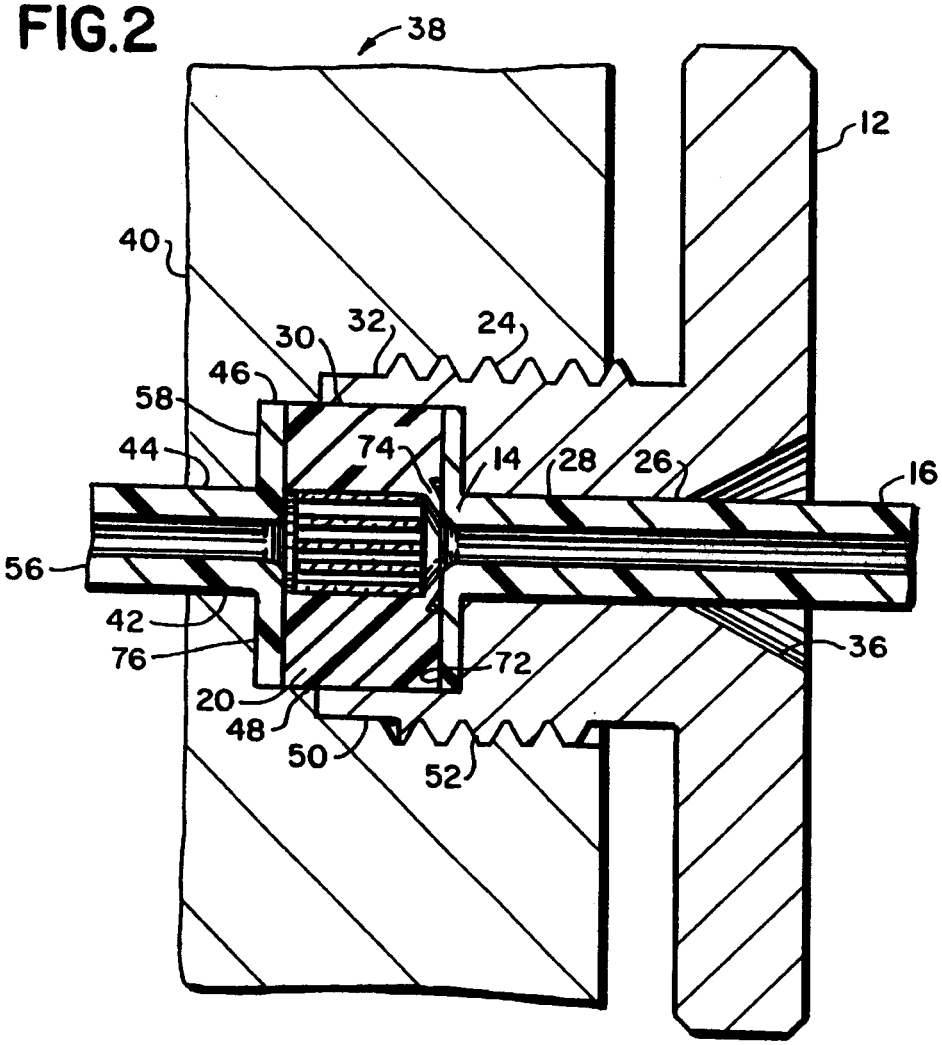
FIG. 2 is an enlarged sectional view showing the in-line filter assembly of FIG. 1 in an operational position in the analyzer.

Referring now back to FIG. 2, it is clear that the conduit 16 extends through the coupling 12 and its flare 14 is in firm surface contact with the face 72 of the filter mount 20. The latter may be provided with a deformable annulus 74 which is adapted to butt against the flared end 14 of conduit 16 to form a fluid-tight seal when the filter is assembled as will be described. Similarly, the conduit 56 extends through the coupling member 40 and its flared end 58 is in firm contact with the face 76 of the filter mount 20.

Assembly of the in-line filter arrangement of this embodiment is readily accomplished by the simple insertion of the conduits 16 and 56 into the passageways 26 and 42 so that their flared ends 14 and 58 are positioned in the bores 30 and 46 respectively. The filter mount 20 is then closely fitted into the axial bore 30 of coupling 12. Thereafter, the coupling is positioned so that the threads 24 thereon engage the mating threads 52 of the complementary member 38 and the coupling is then tightened into the complementary member to firmly press the flared ends 14 and 58 of the conduits against the opposed surfaces of the filter mount as depicted in FIG. 2 to form an extremely fluid-tight juncture, or pressure fitting there between, and place the same in unrestricted fluid flow communication.

As noted hereinabove, while the complementary mating component 38 has been described as a mating coupling or fitting, it will be appreciated that it may be, in the alternative, the body of a valve or other system component, in which instance, the conduit 56 and flare 58 may be replaced by a suitable seat or washer adapted to ensure a fluid-tight seal between the filter mount and component 38 when the in-line filter assembly is completed. In either situation, it will be appreciated that the filter assembly can be thought of as including first and second body components having axial passages therethrough. and when the components are assembled, the axial passages are brought into fluid communication, with the filter element positioned within the path of fluid flow.

There is illustrated in FIGS. 6 and 7 another preferred embodiment of the present invention wherein the filter element is fixedly held within a section of flexible or heat shrinkable tubing. In this embodiment, generally identified by reference numeral 100, a length of tubing 102 is provided with conventional coupling members 104 and 106 at each end, for connecting the tubing section between various system components. While coupling members 104 and 106 are shown as having male threaded portion 108 and female threaded portion 110 respectively, other coupling means may be utilized, such as, for example, quick-disconnect fittings. A filter element 112 is similar to filter element 22 described hereinabove, but optionally may be provided as shown with convex faces 114 and 116 in lieu of the parallel faces 66 and 68 respectively as in element 22. As will be appreciated by those skilled in the art, this configuration has the effect of spreading any debris in the flowing stream across the upstream face of the filter rather than concentrating it at the longitudinal axis of the filter, since the pressure drop through the filter element is less for those passages closer to the tubing interior wall 118 than for those proximate the axial centerline of the tubing, and the fluid sample will be urged to the former passageways. The filter element 112 may then be fixedly situated in the length of conduit 102 as shown by first positioning the filter element within the tubing and then heat shrinking the tubing around the filter element to hold it firmly in position therein. Alternatively, the filter element 112 may be simply forced into flexible tubing such as silicone rubber. The axial extent 120 of the filter element body aids in maintaining the filter element in proper alignment within the conduit. As with the element 22, the axial extent of the filter element 112 need only be greater than the average length of the fibrous matter believed to be present in the sample.

Tests were performed to evaluate the effectiveness of the filter of the present invention, and particularly the effect such a filter would have on the cell integrity of whole blood samples. A filter arrangement such as that described in FIGS. 1 to 5 was installed in a Technicon H*1 hematology analyzer manufactured by Technicon Instruments Corporation, Tarrytown, N.Y. Comparison of the results of samples run on the analyzer so modified and identical samples run on an analyzer without the filter showed no detectable change on the parameters measured. Thus, it was demonstrated that the filter construction does not disturb the integrity of the cells in the sample.

It is believed that the superior performance of the filter of the present invention is due to the fact that the average length of the fibrin and other fibrous material that may become lodged in the passageways of the filter is shorter than the longitudinal dimension of the filter element body, so that on backflushing of the filter, this material does not become entangled in adjacent passages as its downstream end does not extend beyond the face of the filter element and is readily flushed from the filter.

While the subject filter is adapted for prolonged use and backflushing before serious clogging, it will be necessary, at some point in its operation, to remove the filter element from the system to flush debris clogging the filter passageways.

The clogged filter may be cleaned ultrasonically by displacing or dissolving the clogging material from the passageway. If the arrangement of the preferred embodiment illustrated in FIGS. 1 to 5 is used, the filter mount is removed from the coupling by disassembling the coupling 12 from the complementary component 38. It may then be placed in a small glass or polyethylene container with a suitable wash solution, which may have sodium hydroxide and/or sodium hyperchloride or other strong cleaning agents such as acids, as its active ingredient. The ultrasonic cleaner is then activated for approximately five minutes. The filter mount is then removed from the container and placed into distilled water with the ultrasonic cycle repeated for an additional five minutes. Such treatment should readily remove debris from the filter passages.

If the filter arrangement of the alternative embodiment of FIGS. 6 and 7 is used, the conduit section may be removed from the apparatus and placed in an ultrasonic cleaning device.

The filter assembly may be cleaned without the use of ultrasonics. The filter mount is placed in the wash solution such as that described hereinabove, and left to sit for at least one hour. It is then removed from the wash and placed in distilled water for approximately another hour.

It will be appreciated by those skilled in the art that the filter element should be formed from a material capable of withstanding strong cleaning agents.

While the in-line filter arrangement in accordance with the present invention has been described in conjunction with its use in an automated clinical analyzer for filtering fibrous matter from whole blood, it will be appreciated by those skilled in the art that our invention may have application in the filtering of fibrous material from other fluids.

Some advantages of the present invention evident from the foregoing description include an in-line filter arrangement adapted for use in an automated clinical analyzer, which is highly effective and readily replaceable in the system when clogged.

In view of the above, it will be seen that several objects of the invention are achieved and other advantageous results obtained.

As various changes can be made in the above constructions without departing from the scope of the invention, it is intended that all matter contained in the above description or shown in the accompanying drawings shall be interpreted as illustrative, not in a limiting sense.

We claim:

1. A method for filtering a [whole blood] *fluid* sample comprising the steps of:

a) flowing said [whole blood] *fluid* through a filter arrangement which filter arrangement includes a generally cylindrical body portion having opposed first and second faces and provided with a multiplicity of passageways substantially parallel to the longitudinal axis of said body portion extending between said opposed first and second faces, said passageways constructed and arranged to entrap fibrous matter carried in the [whole blood] *fluid* sample as the sample flows through said passageways from said first opposed face, said first and second opposed faces spaced apart a distance at least as great as the average length of said fibrous matter so that said fibrous matter will not extend beyond said second face and can be dislodged from said passageways by backflushing;

b) entrapping said fibrous matter within said filter arrangement; and c) backflushing said filter arrangement to dislodge said entrapped fibrous matter from said passageways.

2. The method of claim 1 wherein said opposed faces are substantially parallel to each other, and substantially perpendicular to the longitudinal axis of said body portion.

3. The method of claim 1 wherein said opposed faces are both convex.

4. The method of claim 1 wherein the filter arrangement further includes:

a. a first body component having an axial passage therethrough between opposite body ends;

b. a cavity in said first body component intermediate said ends;

c. a second body component having an axial passage, said first and second body components constructed and arranged to be releasably secured to each other whereby said axial passages are in fluid communication: and wherein said filter arrangement further includes a filter mount adapted to receive said generally cylindrical body portion, said filter mount received within said cavity.

*5. The method of claim 1, wherein said fluid sample is whole blood.*

*6. An in-line filter for filtering elongated fibrous matter having a predetermined size from a fluid sample, said filter comprising a generally cylindrical body portion with a longitudinal axis, said body portion having a pair of opposed faces and a multiplicity of passageways extending through said body portion substantially parallel to the longitudinal axis and having opposite open ends at said*

*opposed faces, said passageways being of a predetermined axial length to facilitate trapping of only one end portion of fibrous matter at one of said opposed faces when a fluid sample with the fibrous matter flows through said passageways from said one opposed face to the other opposed face, the open ends of said passageways at said one opposed face having rounded edges to eliminate sharp protuberances or burrs and permit the fibrous matter trapped at the open ends of said passageways at said one opposed face to be dislodged from said filter by backflushing.*

*7. The in-line filter of claim 6 wherein said opposed faces are convex.*

*8. The in-line filter of claim 6 wherein said body portion is formed of glass.*

*9. The in-line filter of claim 6 wherein the body portion has a diameter of approximately 0.060 inches and an axial length of approximately 0.080 inches.*

*10. The in-line filter of claim 9 wherein said passageways have a diameter of approximately 0.008 inches.*

*11. The in-line filter of claim 10 wherein said body portion has nineteen of said passageways.*

* * * * *

UNITED STATES PATENT AND TRADEMARK OFFICE

CERTIFICATE OF CORRECTION

PATENT NO. : Re. 35,316

DATED : August 27, 1996

INVENTOR(S) : Kent M. Negersmith et al.

It is certified that error appears in the above-indentified patent and that said Letters Patent is hereby corrected as shown below:

On title page, column 1, At [64], change "Appl. No.: 430,197" to --Appl. No.: 490,197--

On title page, column 2, line 11 in Abstract, change "complemnetary" to --complementary--

On title page, Column 2, line 20 in Abstract, change "alterntive" to --alternative--

Column 1, line 43, change "an" to --art--

Column 3, line 12, change "or" to --of--

Column 5, line 66, change "number." to --number,--

Column 6, line 41 change "therethrough." to --therethrough,--

Signed and Sealed this

Seventh Day of January, 1997

*Attest:*

*Attesting Officer*

BRUCE LEHMAN

*Commissioner of Patents and Trademarks*